(12) United States Patent
Heathcote

(10) Patent No.: US 10,548,259 B2
(45) Date of Patent: Feb. 4, 2020

(54) SEED METER ASSEMBLY

(71) Applicant: COTE AG TECHNOLOGIES, LLC, West Des Moines, IA (US)

(72) Inventor: Chad Heathcote, West Des Moines, IA (US)

(73) Assignee: Cote Ag Technologies, LLC, West Des Moines, IA (US)

( * ) Notice: Subject to any disclaimer, the term of this patent is extended or adjusted under 35 U.S.C. 154(b) by 0 days.

(21) Appl. No.: 15/986,221

(22) Filed: May 22, 2018

(65) Prior Publication Data

US 2018/0338409 A1 Nov. 29, 2018

Related U.S. Application Data

(63) Continuation-in-part of application No. 15/148,081, filed on May 6, 2016, now Pat. No. 10,104,830.

(51) Int. Cl.
*A01C 7/04* (2006.01)
*A01C 7/20* (2006.01)
*A01C 7/10* (2006.01)

(52) U.S. Cl.
CPC .............. *A01C 7/046* (2013.01); *A01C 7/105* (2013.01); *A01C 7/20* (2013.01)

(58) Field of Classification Search
CPC ......... A01C 7/046; A01C 7/044; A01C 7/042; A01C 7/04; A01C 7/00; A01C 7/105; A01C 7/102; A01C 7/10; A01C 7/08; A01C 7/20; A01C 21/005; A01C 21/00
See application file for complete search history.

(56) References Cited

U.S. PATENT DOCUMENTS

| | | |
|---|---|---|
| 5,842,428 A | 12/1998 | Stufflebeam et al. |
| 6,748,885 B2 | 6/2004 | Sauder et al. |
| 7,717,048 B2 | 5/2010 | Peterson, Jr. et al. |
| 8,371,239 B2 | 2/2013 | Rans et al. |
| 8,479,671 B2 | 7/2013 | Shoup |
| 8,522,889 B2 | 9/2013 | Adams et al. |
| 8,776,702 B2 | 7/2014 | Bassett |
| 8,850,998 B2 | 10/2014 | Garner et al. |
| 8,924,092 B2 | 12/2014 | Achen et al. |
| 10,104,830 B2 * | 10/2018 | Heathcote .............. A01C 7/046 |
| 2008/0110382 A1 | 5/2008 | Brockmeier |
| 2010/0192818 A1 | 8/2010 | Garner et al. |
| 2014/0026748 A1 | 1/2014 | Stoller et al. |
| 2014/0262378 A1 | 9/2014 | Connors et al. |
| 2015/0319919 A1 | 11/2015 | Sauder et al. |

* cited by examiner

*Primary Examiner* — Christopher J. Novosad
(74) *Attorney, Agent, or Firm* — Zarley Law Firm, PLC

(57) ABSTRACT

A row planter system having a seed meter assembly and a seed delivery system. The seed meter assembly has at least one seed plate disposed within a housing and a vacuum assembly having a single vacuum port connection in the housing. The row planter system also includes a volumetric granular meter that is interchangeable with the seed meter assembly and adapted for co-application of a second product variety. The seed delivery system is adapted to hold and deliver a seed from the seed meter to a furrow while reducing and/or eliminating roll and bounce.

6 Claims, 23 Drawing Sheets

SEED METER ASSEMBLY

CROSS-REFERENCE TO RELATED APPLICATION

This continuation-in-part application claims the benefit of U.S. application Ser. No. 15/148,081 filed on May 6, 2016.

BACKGROUND OF THE INVENTION

This invention is directed to a low friction seed meter and more particularly a seed metering system that can be modularly configured to also operate as multi-hybrid low friction seed meter that provides variable rate and speed ability, easily switches hybrids, has interchangeable modules, and is capable of maintaining accurate spacing and performance at high planting speeds.

Seed meters are well-known in the art. Typically, seed enters the seed meter through an opening towards the top of the meter from a hopper. Seed collects in an area adjacent a seed plate. Air pressure from a vacuum source pulls a seed onto the plate through apertures equally spaced near the plate circumference as the plate rotates toward a delivery tube. One or more singulators are used to encourage the presence of only one seed per aperture on the seed plate, such that only one seed per aperture falls into the delivery tube. Typically a sectioned seal is in contact with the back side of the plate that will cut off the air flow in the plate allowing the seed to fall into the delivery tube. Alternatively, a wall or wheel will cut off the air flow in the plate allowing the seed to fall into the delivery tube.

Multi-hybrid seed meters are also known in the art and include a pair of seed plates for selectively planting different hybrid seeds. Typically these separate plates are not symmetrically aligned side by side and require each plate be connected to a separate vacuum hose. Also, they are designed such that they could not be configured to be assembled as a single-hybrid system. While useful, these seed meters are limited in their accuracy, speed, their case of operation, and can be cumbersome to operate. In addition to these limitations, current multi-hybrid seed meters are unable to be used in conjunction with a high-speed seed delivery system. Therefore, a need exists in the art for a seed meter that addresses these deficiencies.

An objective of the present invention is to provide a seed meter that increases seed placement accuracy.

Another objective of the present invention is to provide a seed meter that can be assembled as either a single-hybrid or multi-hybrid system.

Another objective of the present invention is to provide a multi-hybrid system that can be used in conjunction with a high-speed seed delivery system.

A still further objective of the present invention is to provide a seed meter configured for high-speed planting without compromising accuracy.

Yet another objective of the present invention is to provide a seed meter that increases yields.

These and other objectives will be apparent to those skilled in the art based upon the following written description, drawings, and claims.

SUMMARY OF THE INVENTION

A seed meter assembly has a housing mounted to the frame of a row planter. At least one, and preferably two seed plates are disposed within the housing in a symmetrical side by side configuration. Formed in the housing is a seed inlet port to receive seed from either a hopper or air seed delivery system allowing the seed to pool in the lower portion of the seed meter and against the seed plate. Ambient airflow can enter into the housing through inlet ports, allowing a vacuum to pull seeds onto apertures in the seed plate, of which are in communication through a rotary coupling with a single outlet port located in the housing. As the seed plate turns towards the seed release point, it passes through a set of singulators to remove any additional seeds that may be held in place by the vacuum on each aperture.

The symmetrical side by side configuration of the two seed plates allows use with either a traditional gravity drop tube or a proprietary high-speed seed delivery system.

In a different configuration, the seed plate can be replaced with a feed module that can either volumetrically meter granular particulates such as fertilizer, insecticide, or seed. The feed module can be configured with different metering attachments to change the type of metering required.

The seed meter assembly is designed such that it can be configured as a single-hybrid or multi-hybrid seed meter. Also, either configuration can be used with a gravity drop seed tube or a high-speed seed delivery system. With the seed meter assembled in the multi-hybrid configuration, it can be used in such a way as to work with a seed plate on both sides to plant a separate seed type per plate or with a seed plate on one side and a feed module on the other side.

DETAILED DESCRIPTION OF THE PREFERRED EMBODIMENTS

Figure 1:
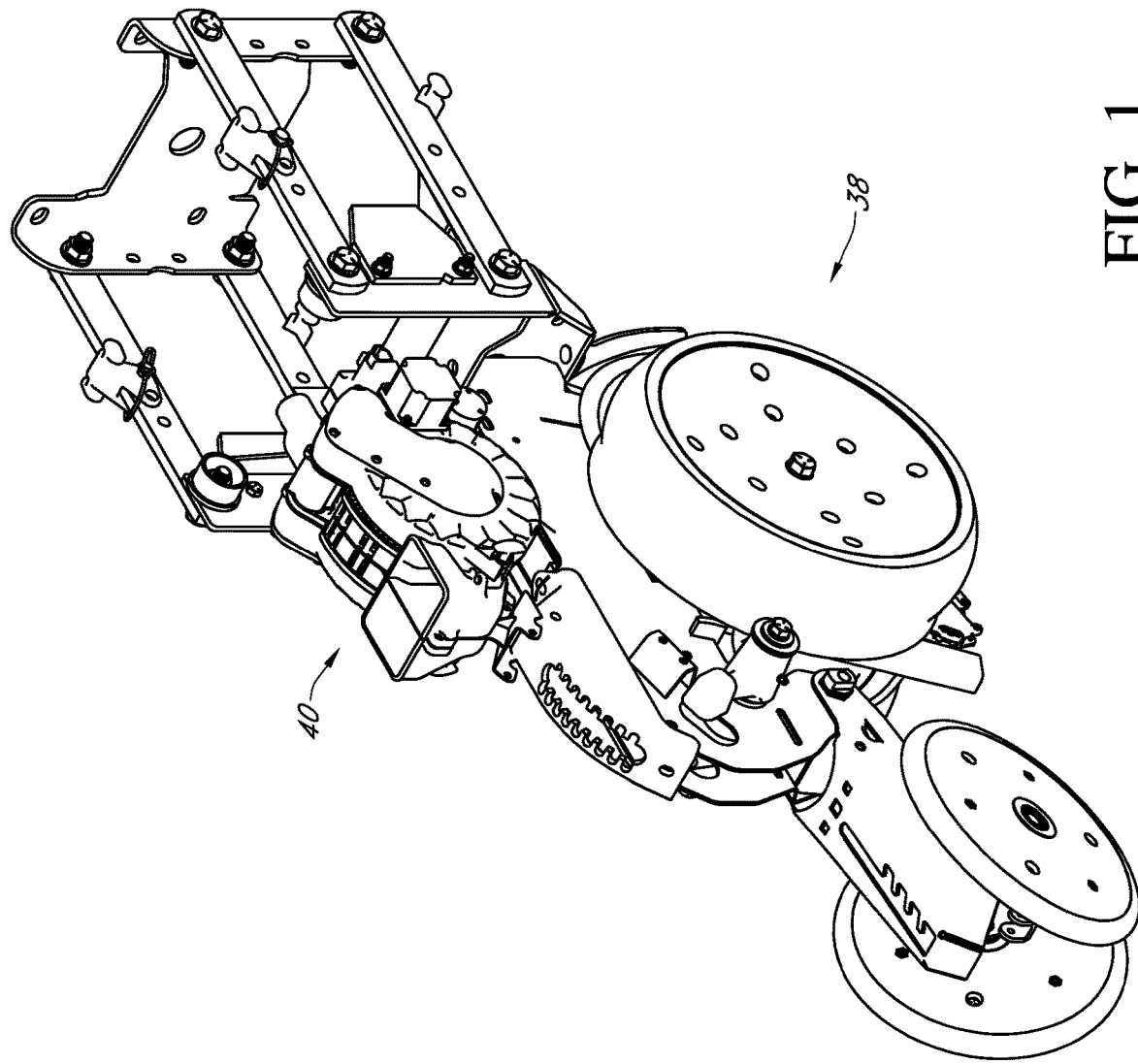
FIG. 1 is a perspective view of a row planter assembly.
Figure 2:
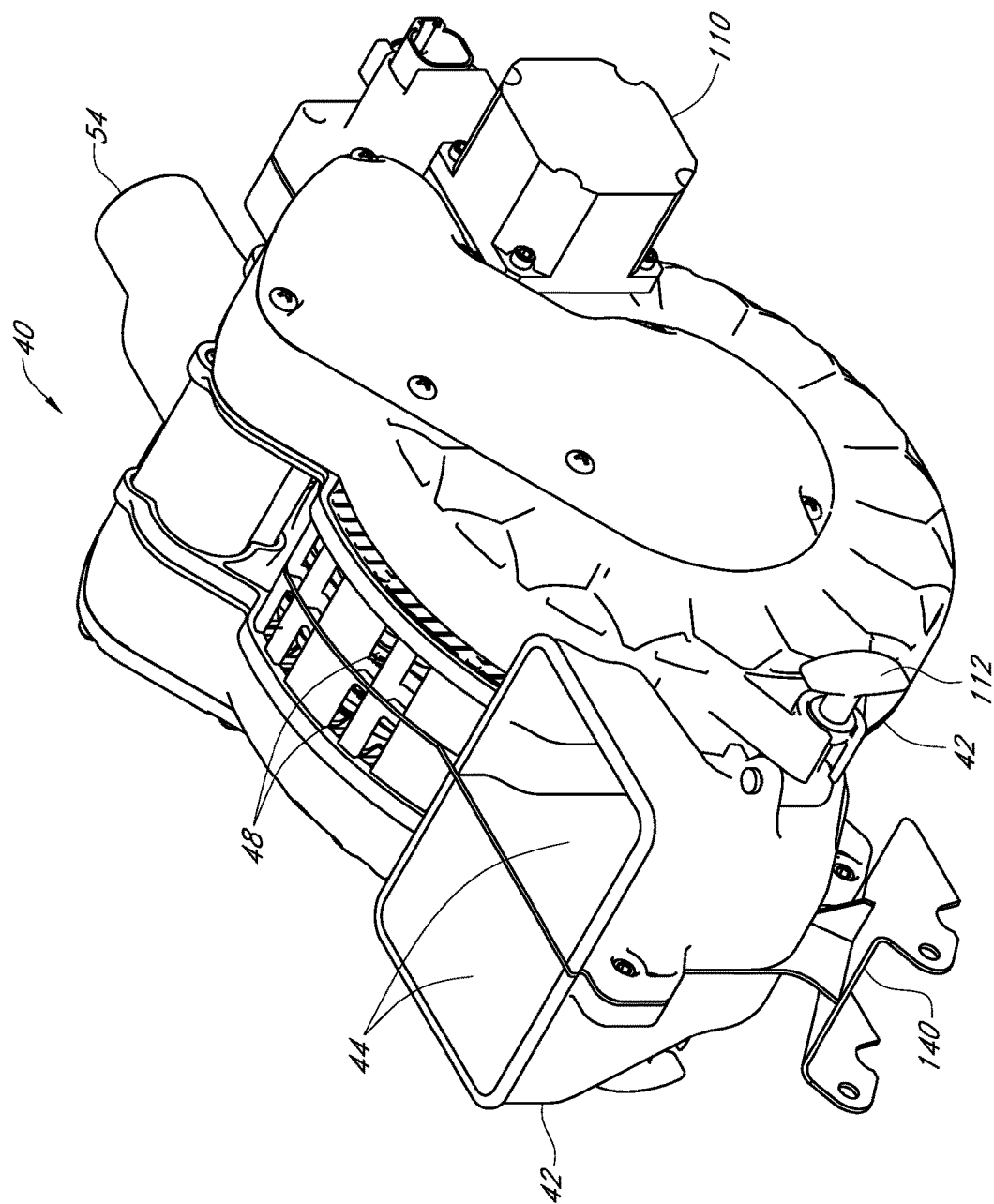
FIG. 2 is a is a perspective view of a seed meter assembly.
Figure 3:
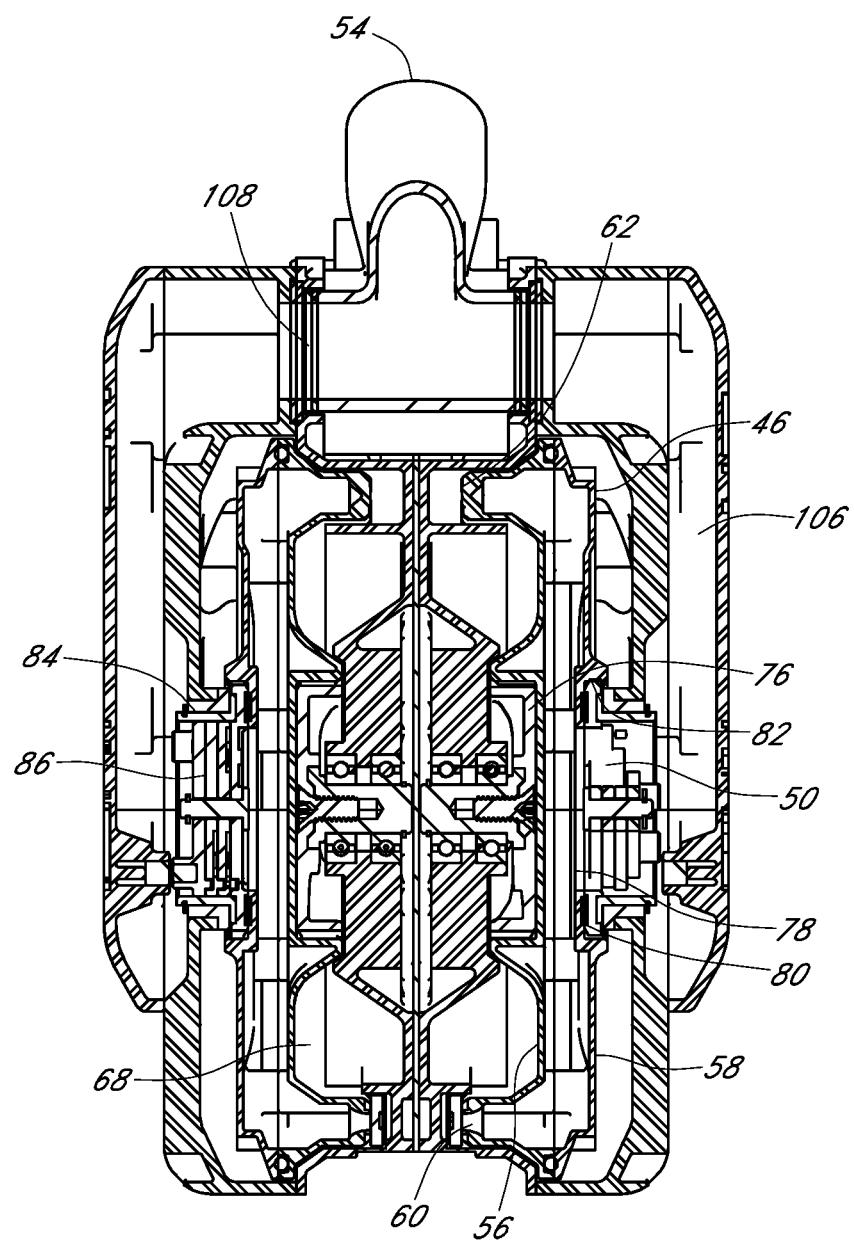
FIG. 3 is a top plan sectional view of a seed meter assembly.
Figure 4:
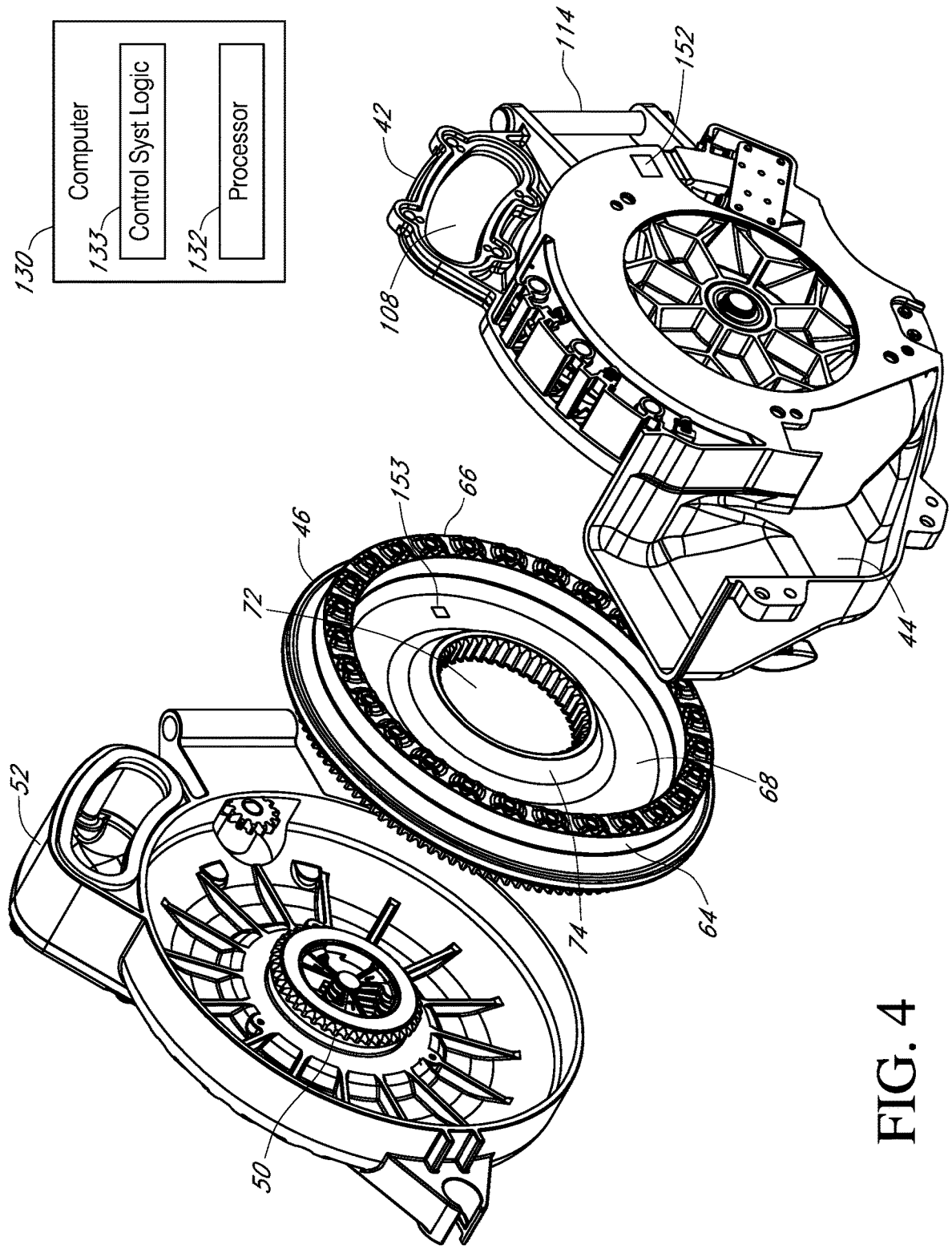
FIG. 4 is an exploded perspective view of a seed meter assembly.
Figure 5:
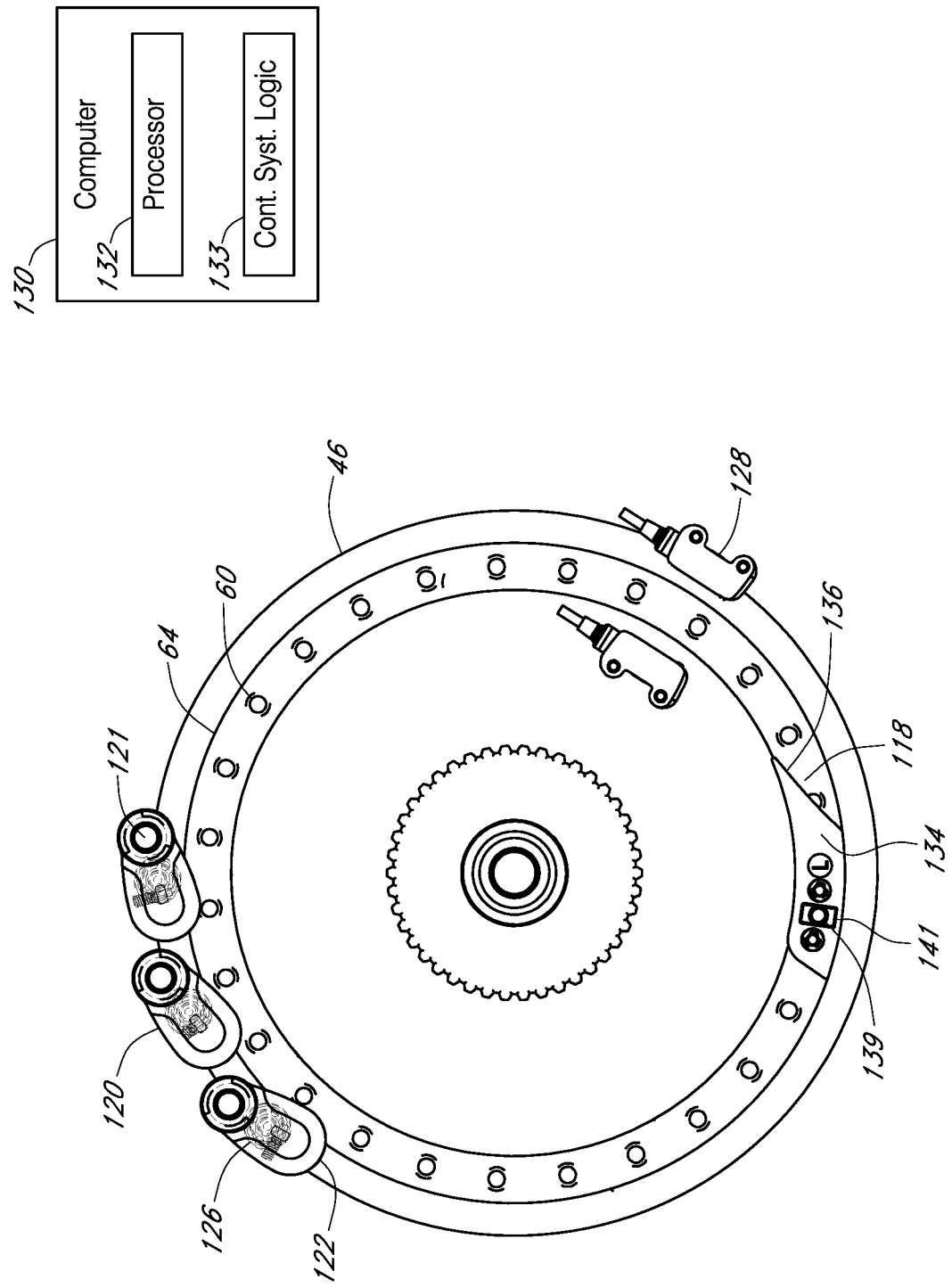
FIG. 5 is a side view of a seed meter assembly.
Figure 6:
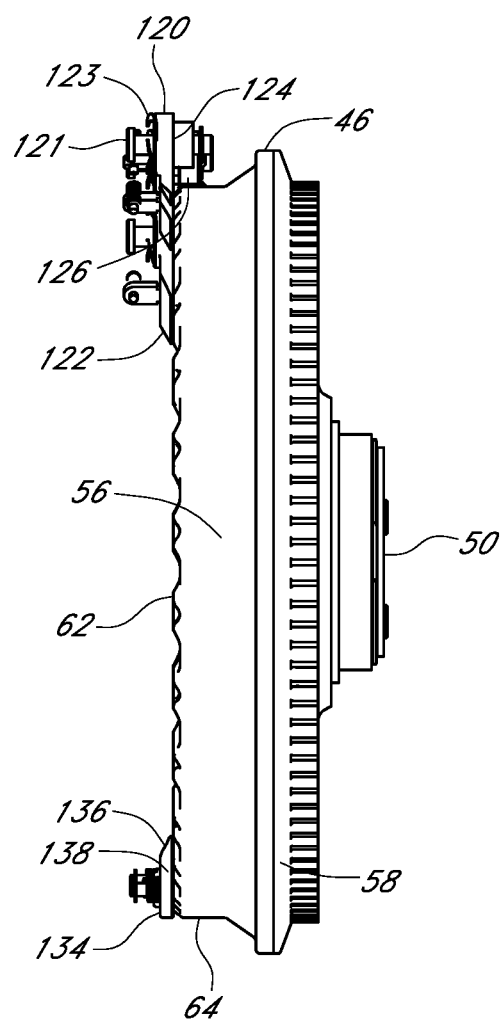
FIG. 6 is a front view of a seed meter assembly.
Figure 7:
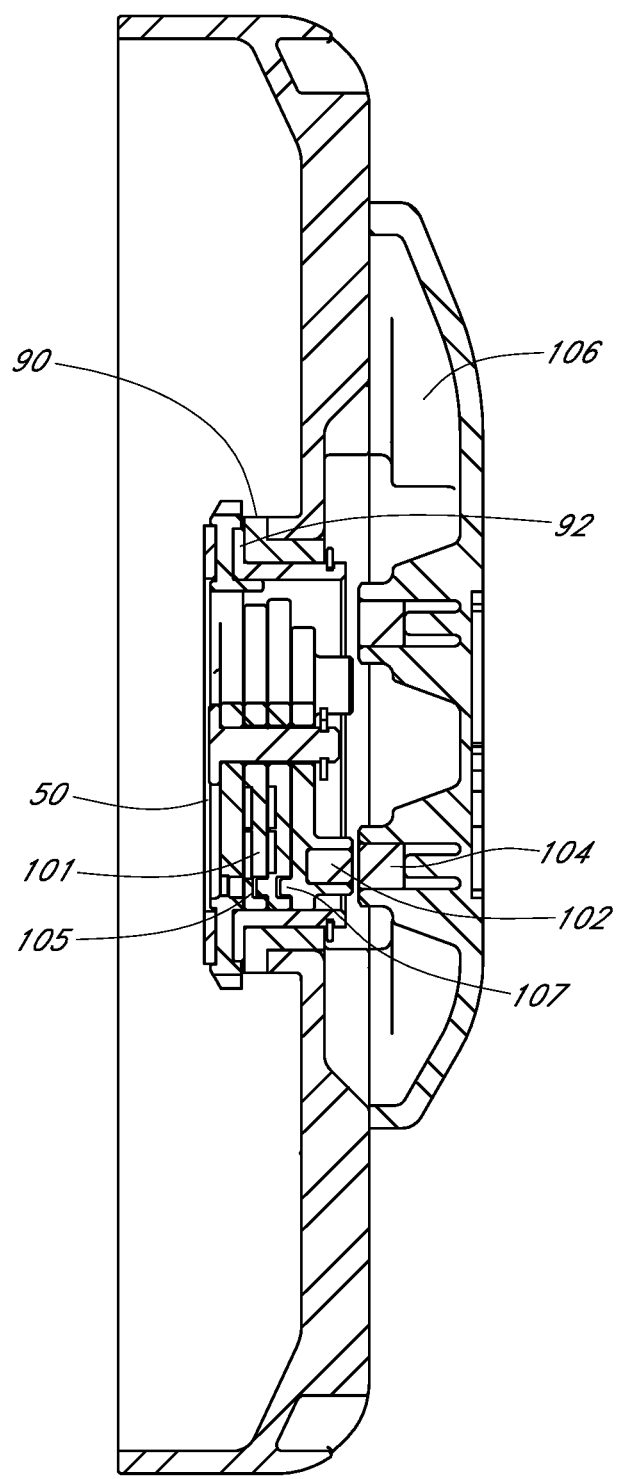
FIG. 7 is a front sectional view of a seed meter assembly.
Figure 8A:
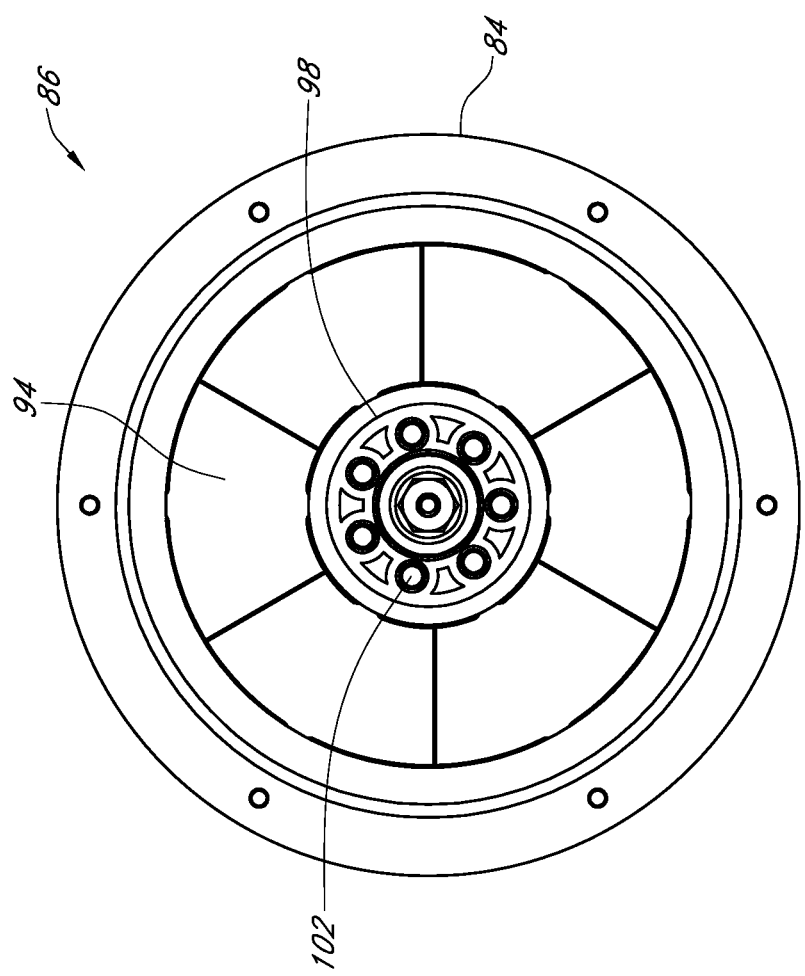
FIG. 8A is a side view of a vacuum shutoff valve assembly.
Figure 8B:
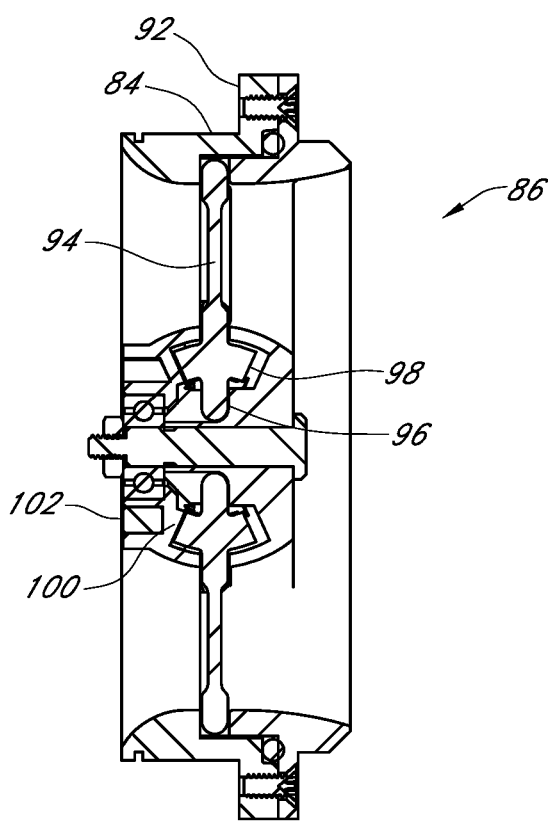
FIG. 8B is a front sectional view of a vacuum shutoff valve assembly.
Figure 9A:
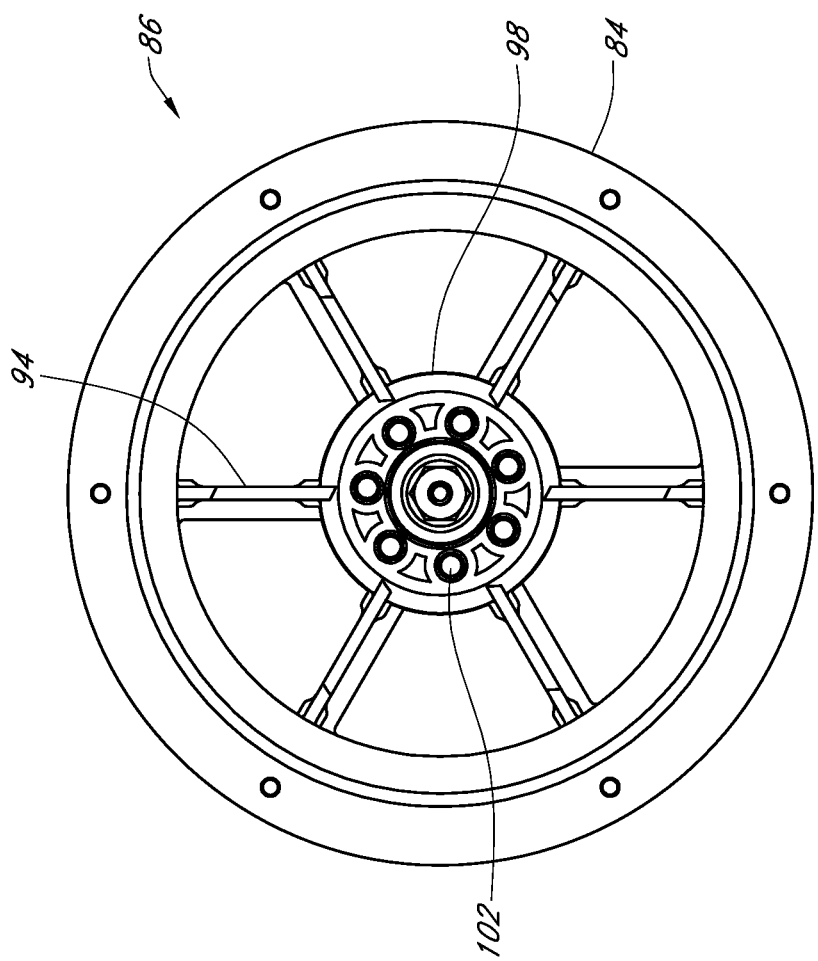
FIG. 9A is a side view of a vacuum shutoff valve assembly.
Figure 9B:
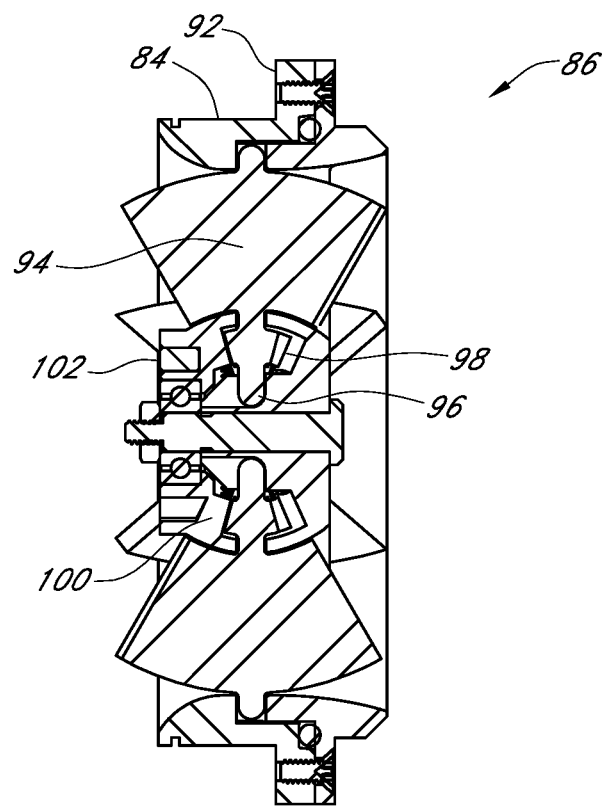
FIG. 9B is a front sectional view of a vacuum shutoff valve assembly.
Figure 10:
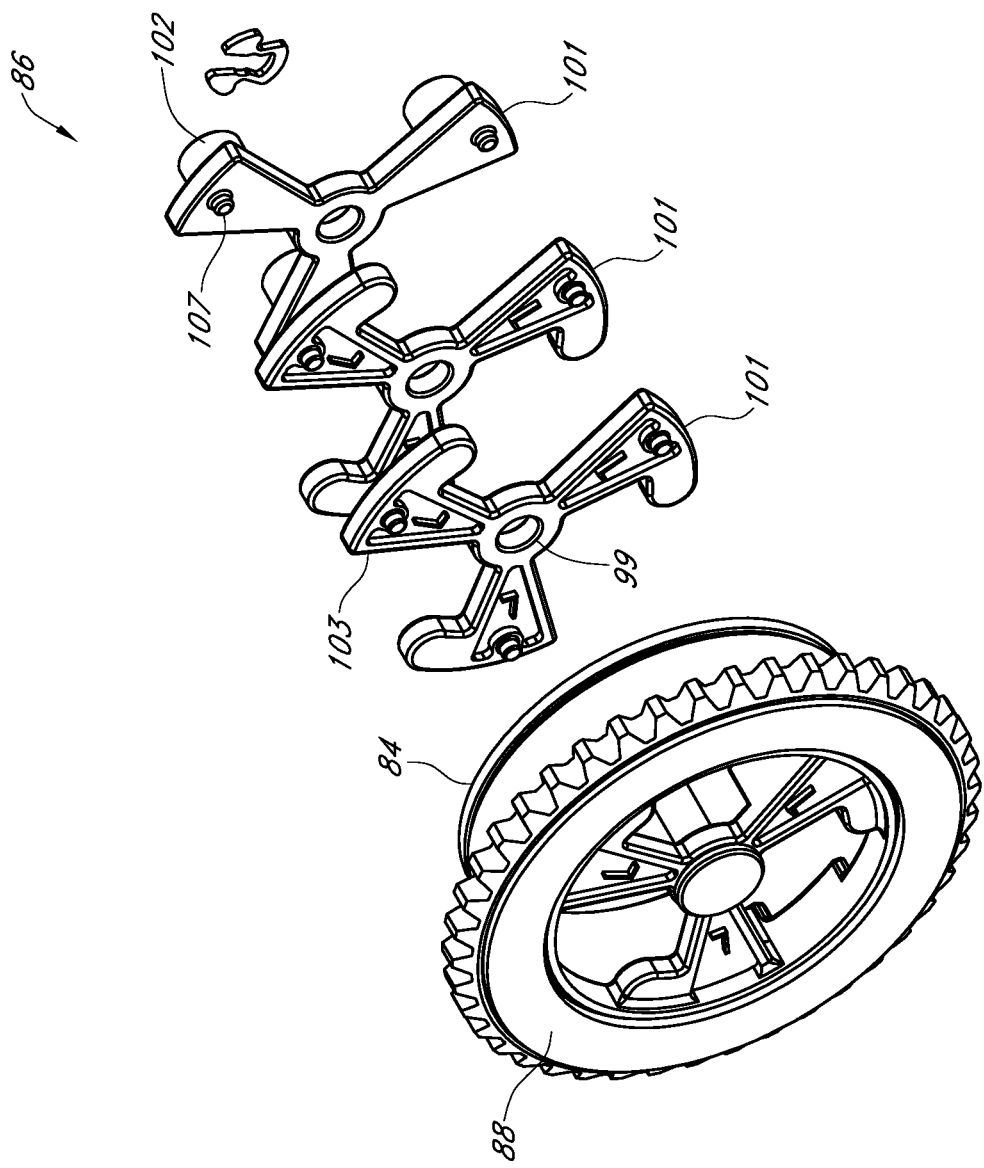
FIG. 10 is an exploded perspective view of a vacuum shutoff valve assembly.
Figure 11A:
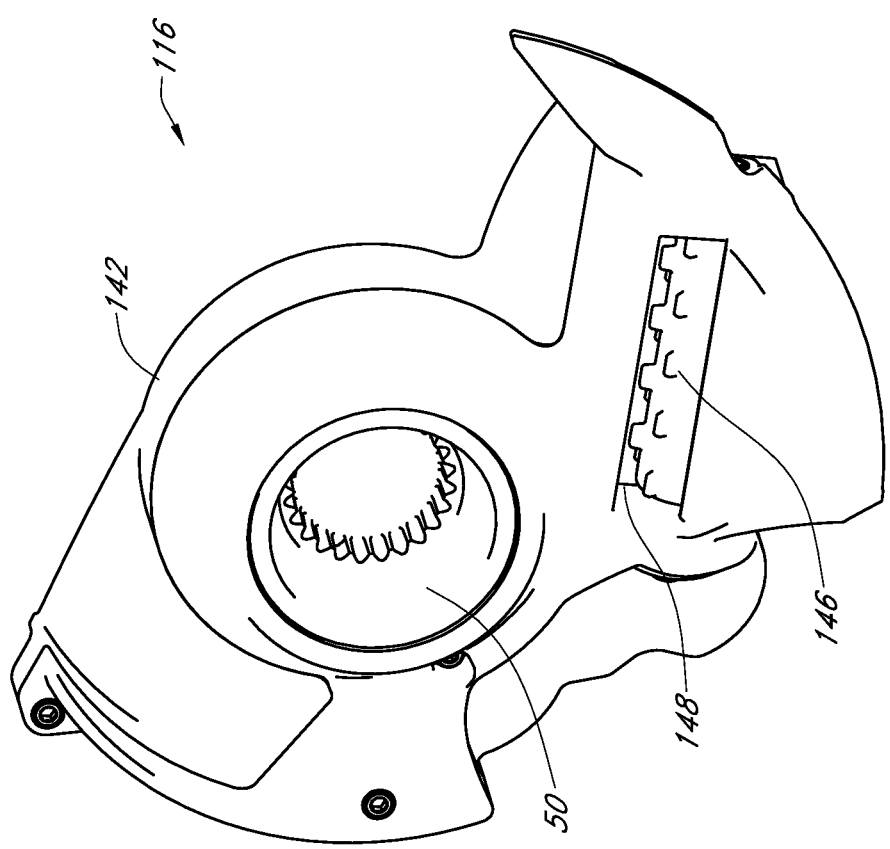
FIG. 11A is a perspective view of a volumetric granular meter.
Figure 11B:
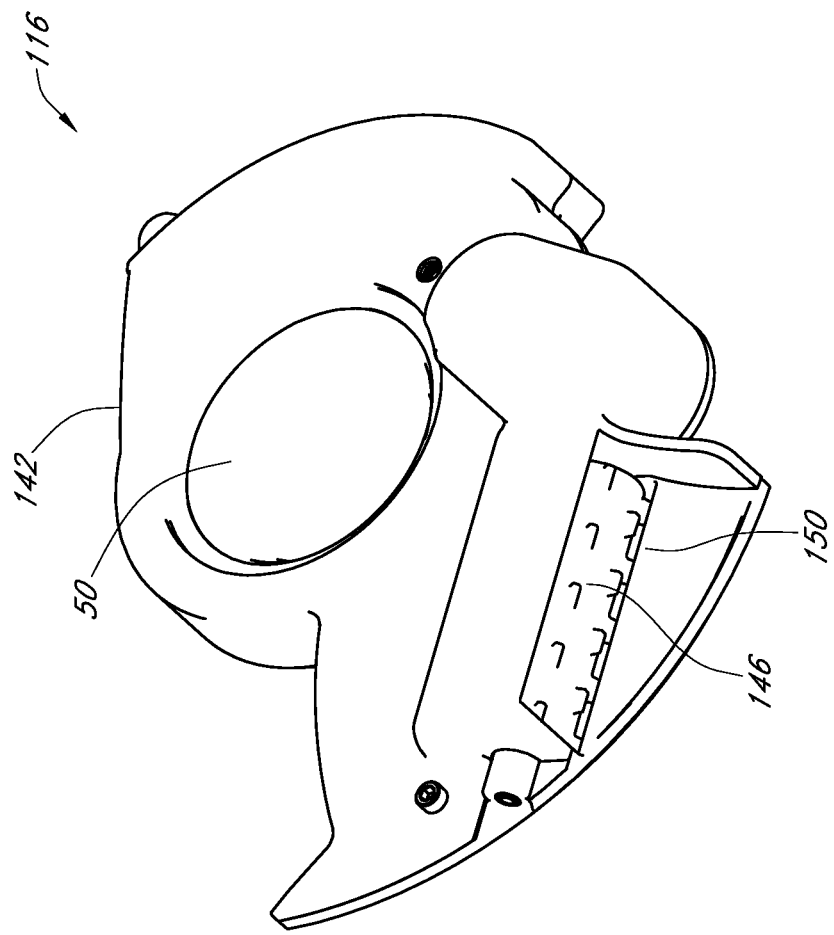
FIG. 11B is a perspective view of a volumetric granular meter.
Figure 12:
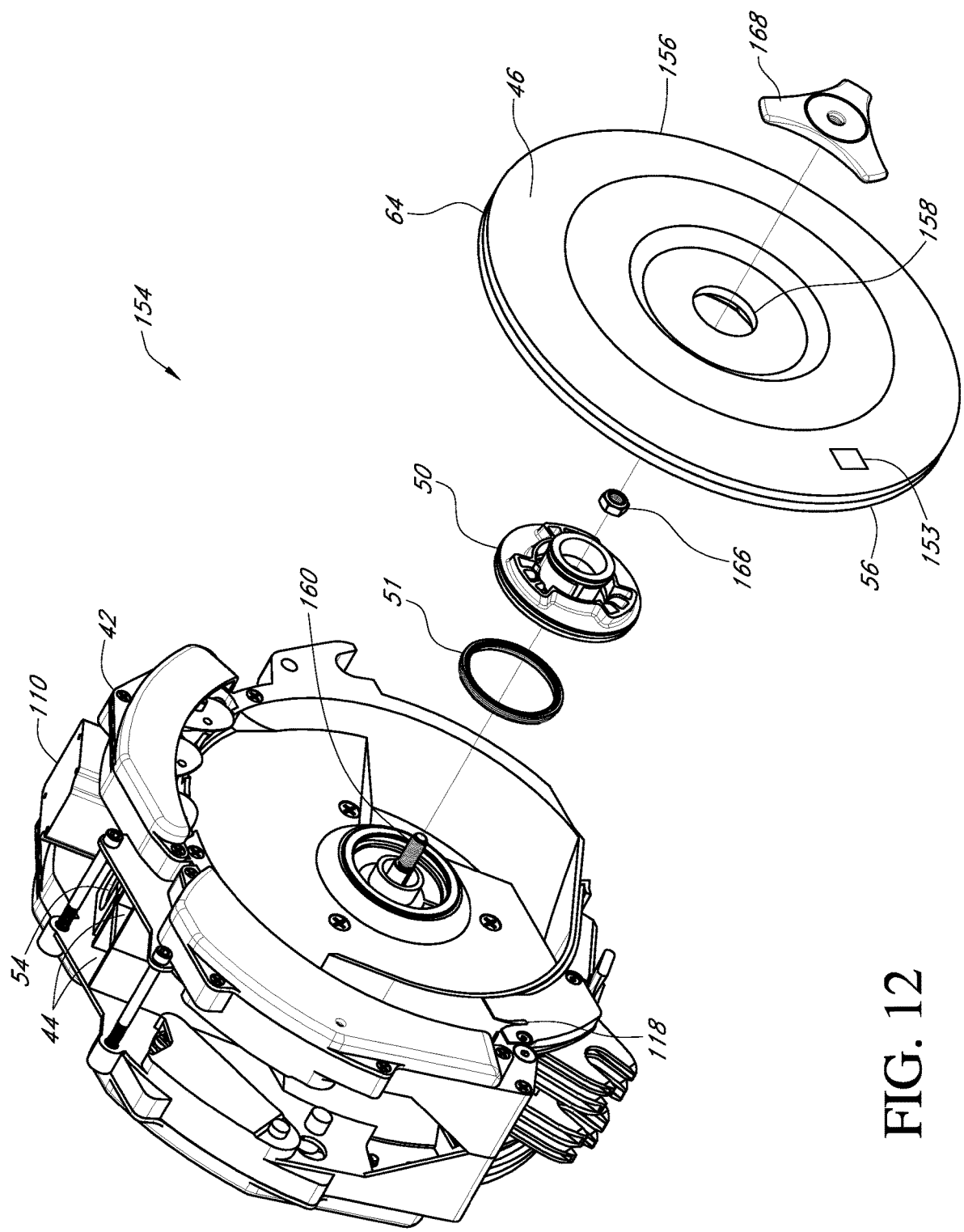
FIG. 12 is an exploded perspective view of a seed meter assembly.
Figure 13:
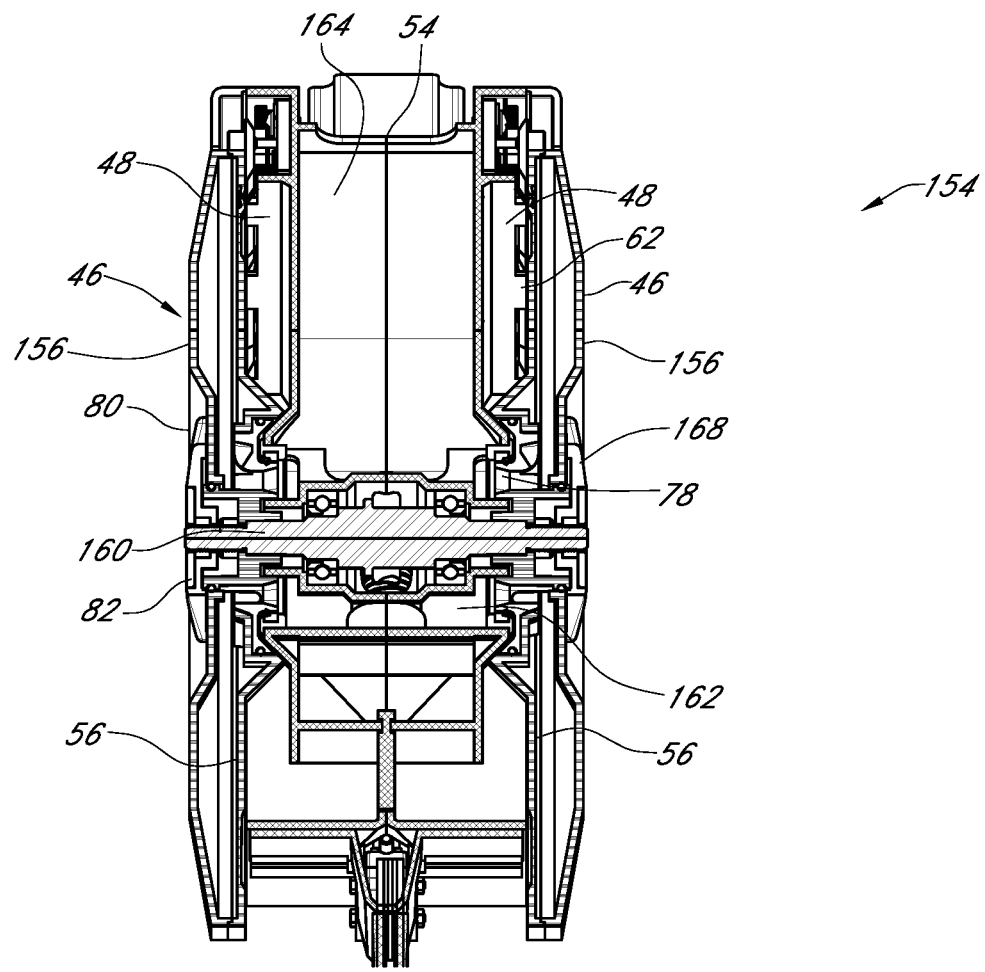
FIG. 13 is a front sectional view of a seed meter assembly.
Figure 14:
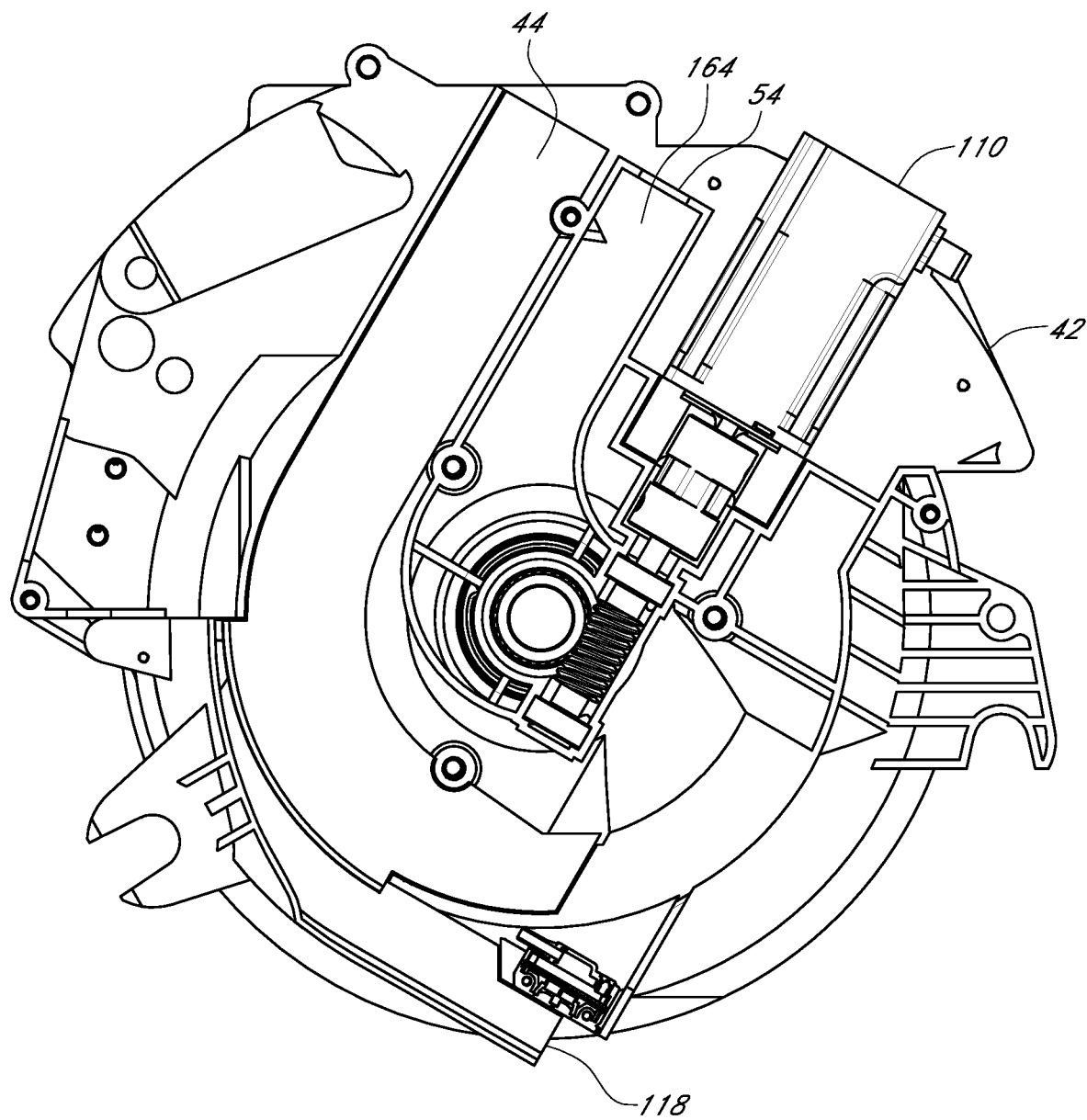
FIG. 14 is a side view of a seed meter assembly.
Figure 15:
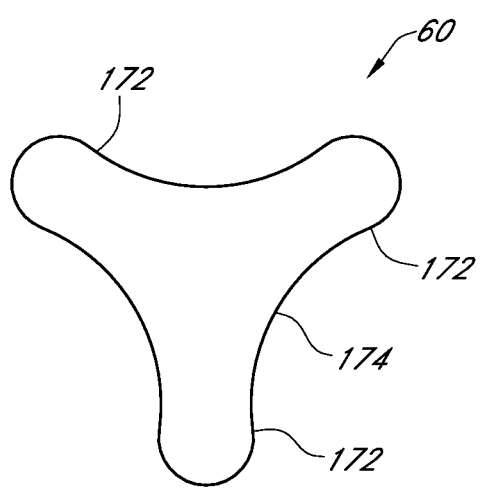
FIG. 15 is a side view of a seed aperture.
Figure 16:
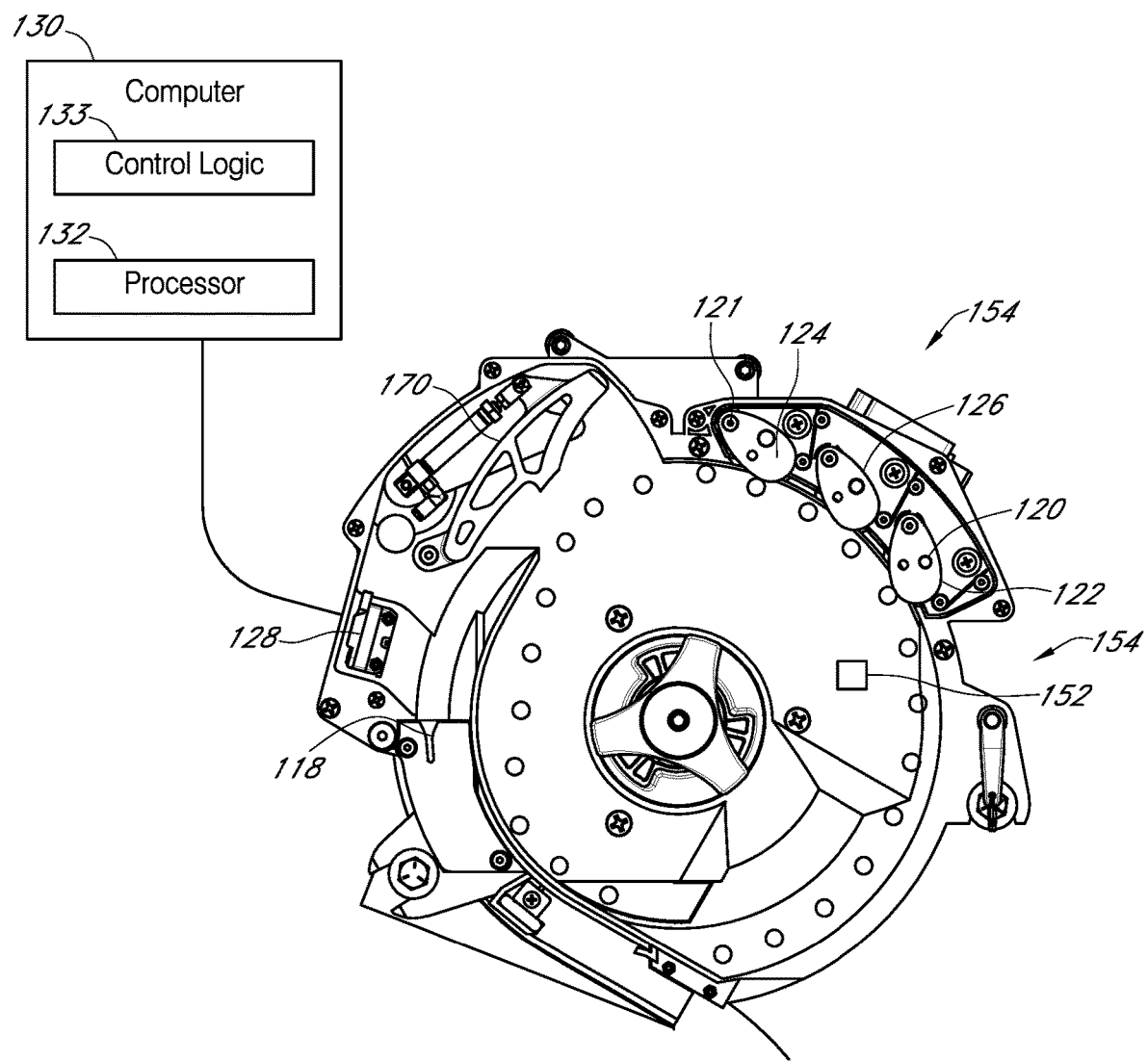
FIG. 16 is a side view of a seed meter assembly.
Figure 17:
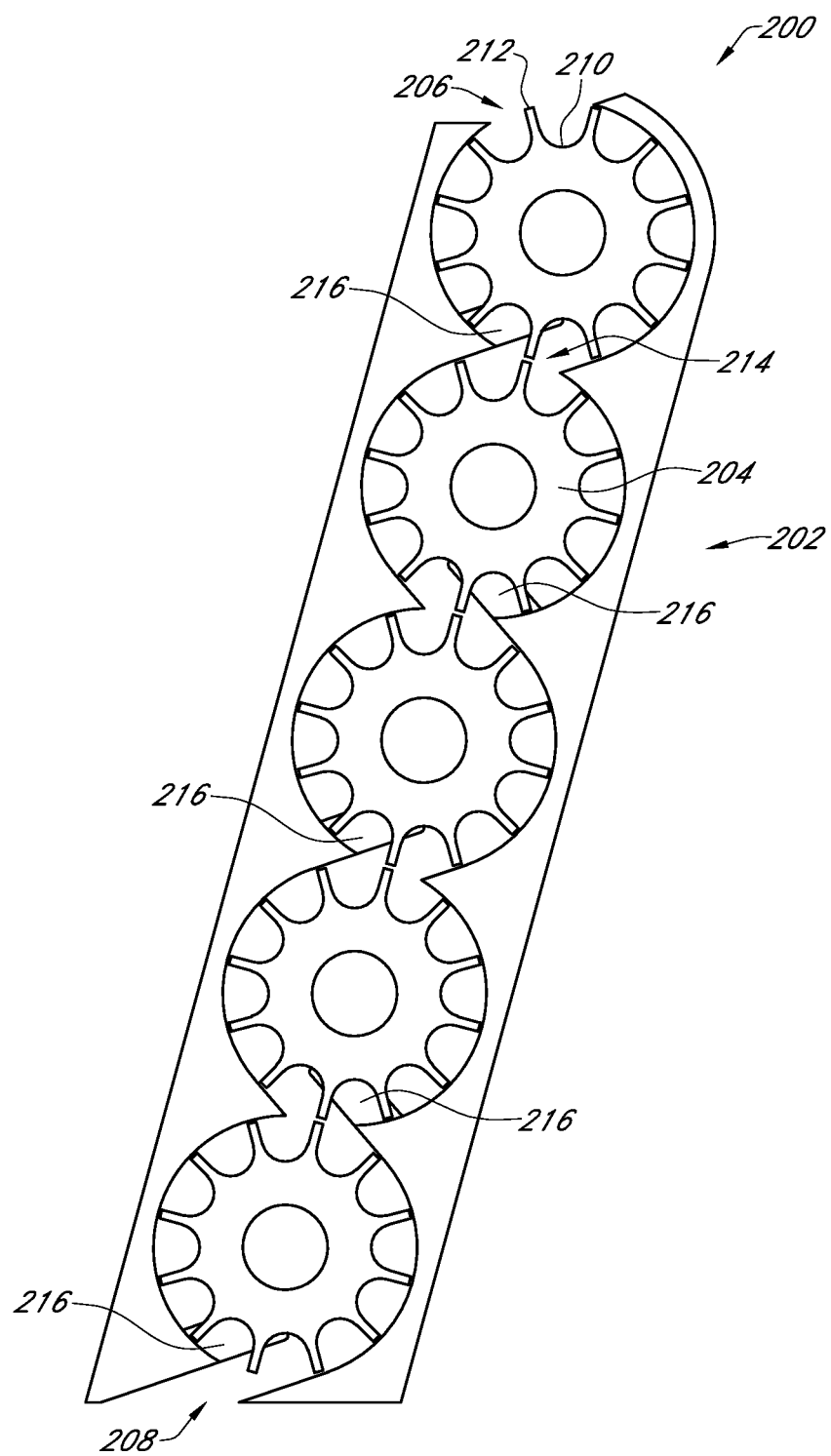
FIG. 17 is a side sectional view of a seed delivery system.
Figure 18:
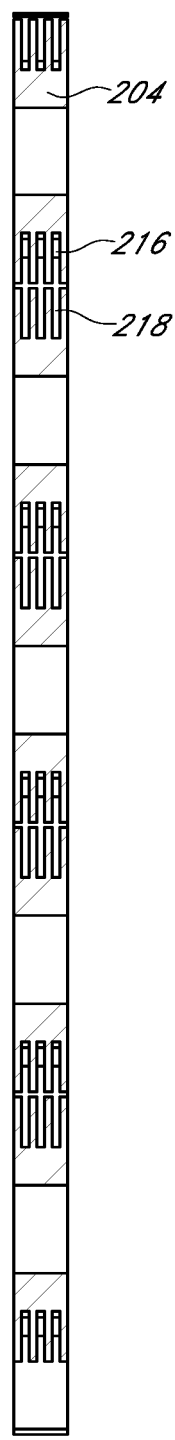
FIG. 18 is an end sectional view of a seed delivery system.
Figure 19:
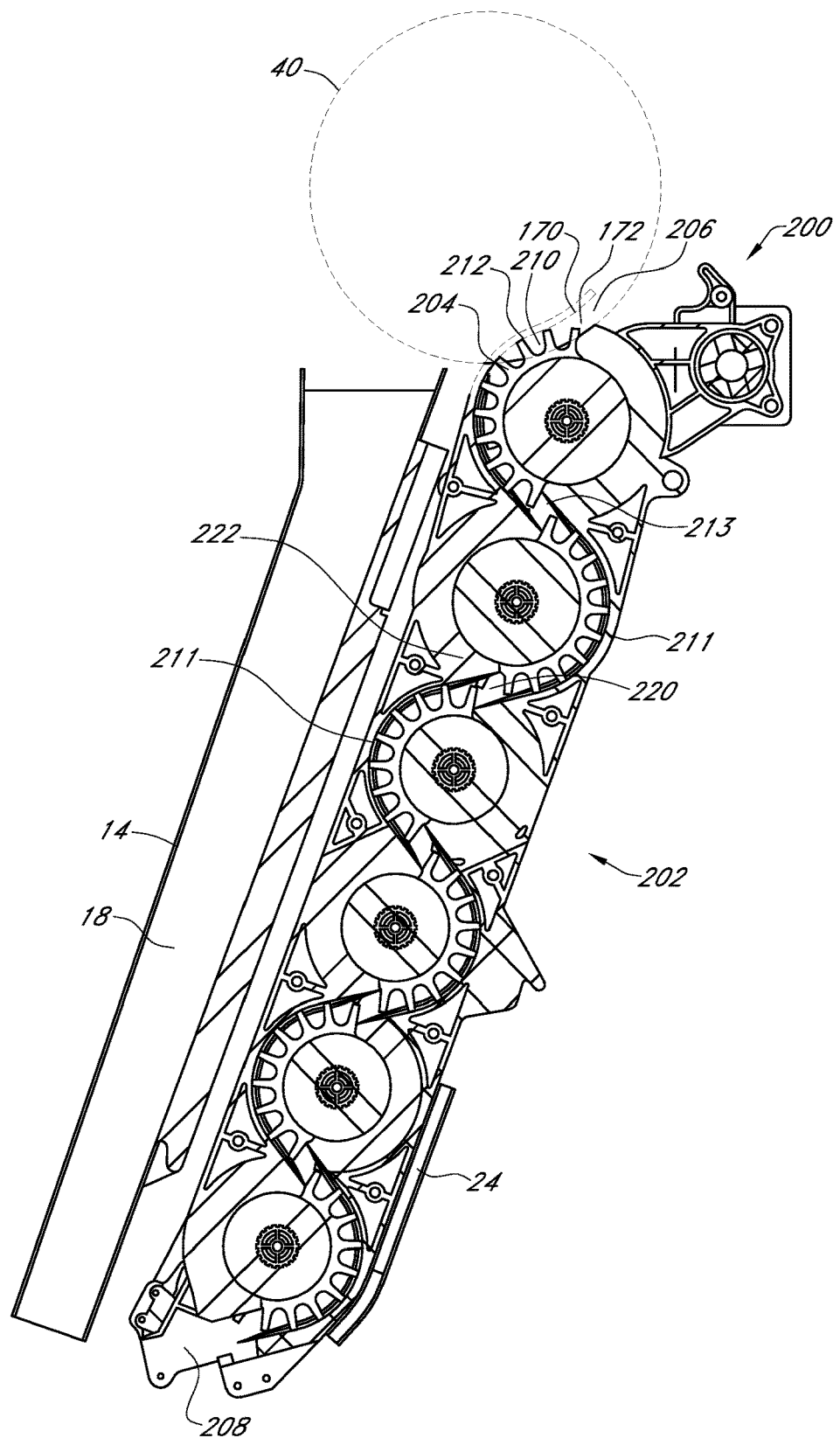
FIG. 19 is a side sectional view of a seed delivery system.
Figure 20:
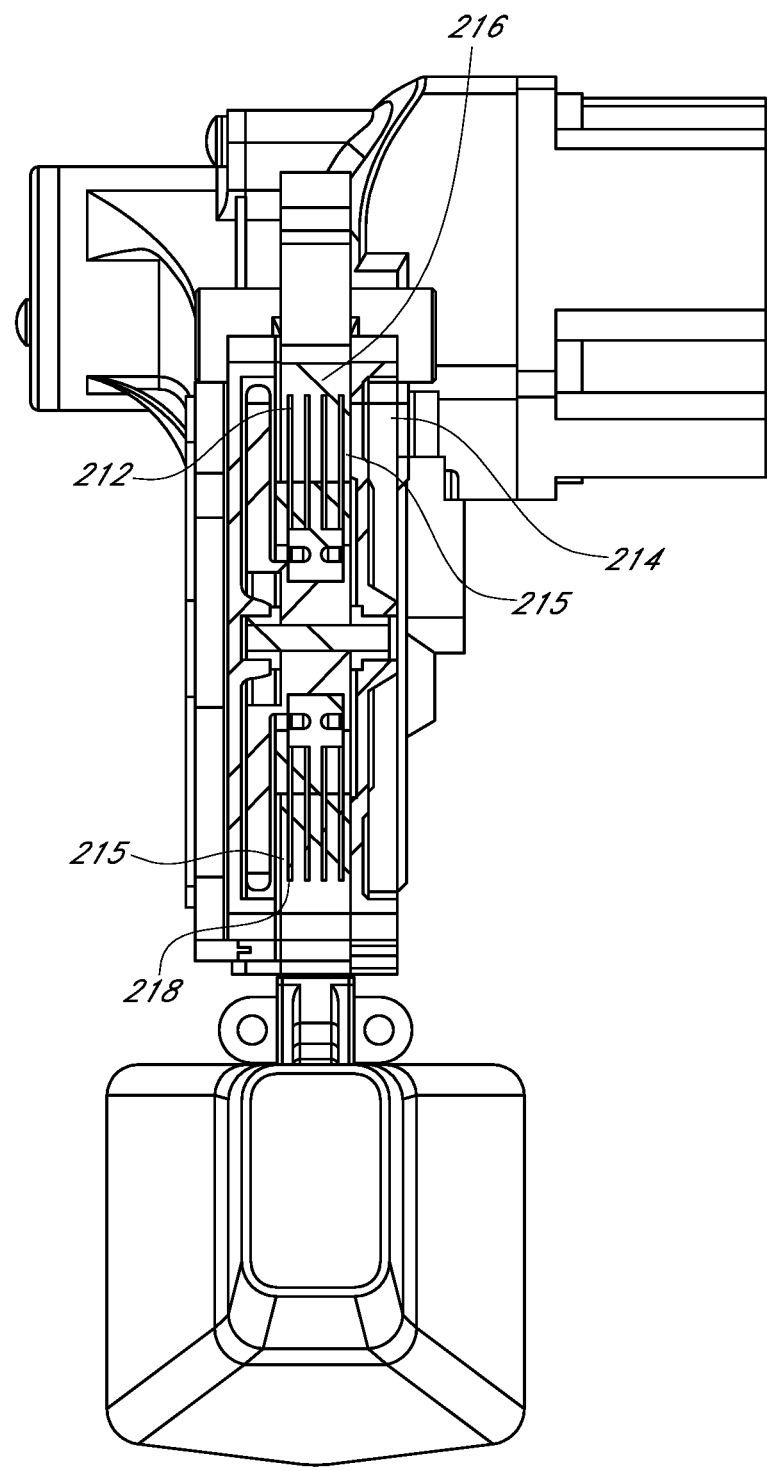
FIG. 20 is a top plan view of a seed delivery system.

In a first embodiment, a seed meter assembly 40 is mounted to the frame of a row planter 38. The seed meter assembly 40 is of any type and preferably is a multi-hybrid low friction type. The low friction seed meter 40 has a meter housing 42 that has a seed inlet port 44 to receive seed from either a hopper or air seed delivery system (not shown). Seed enters the seed inlet port 44 and pools in the lower section of the seed meter assembly 40 where it comes into contact with a seed plate 46. Ambient air flows through air inlet ports 48 in the meter housing 42, then into the seed plates 46, then through a rotary coupling 50, then through a housing cover assembly 52, and through a single vacuum outlet port 54.

The seed plates 46 consists of a seed disc half 56 and a vacuum disc half 58 forming a hollow section by which vacuum flows. The seed disc half 56 has a plurality of seed apertures 60 evenly distributed on the planer face 62 near the bearing edge 64. Adjacent the seed apertures 60 on the planer face 62 are agitation pockets 66 that extend from approximately the seed aperture 60 seed path centerline toward the center of the seed plate 46. The agitation pockets assist the seed to orientate and align with the seed apertures 60, thus ensuring consistent suction of seed onto the seed plate 46. A pooling pocket 68 is formed in the midsection of the seed disc 56 to allow seed a space to collect. Additional agitation ribs (not shown) may be placed in this pooling pocket 68 to further increase seed agitation within the seed pool. A splined pocket 72 extends from an extruded center section 74 to receive a rotatable thrust coupling 76 in the seed meter assembly 40. The vacuum disc half 58 has a vacuum outlet port 78 in the center section. The outlet port has a sealing surface 80 along the peripheral edge. On the outer section of the sealing surface 80 is a splined pocket 82 that is in communication with a rotary coupling 50. Additionally, along the circumferential edge of the vacuum disc half 58 is a plurality of gear teeth that allow engagement by an actuator 110 to drive the seed plate 46.

The rotary coupling 50 consists of a hollow rotary shaft 84 that has a vacuum shutoff valve assembly 86. The rotary shaft 84 has a static seal 88 that is in contact with the sealing surface 80 of the vacuum disc half 58. Also, the rotary shaft 84 is in communication with a rotary bushing 90. This rotary shaft 84 has a sealing face 92 that is in a thrusting contact with the rotary bushing 90 providing a low friction dynamic vacuum seal. The vacuum shutoff valve assembly 86 in one embodiment consist of a plurality of butterfly valves 94 oriented in a radial configuration within the rotary shaft 84. The butterfly valves 94 have a center shaft 96 about which they rotate, on the inside portion of the center shaft 96 is a bevel gear 98. The bevel gear is engaged by a bevel pinion 100. Located along the peripheral edge of the bevel pinion 100 are a plurality of ferromagnetic metal pickups 102. The metal pickups are to be acted on by stationary magnets 104 located in the housing cover assembly 52. Preferably, there will be an odd number of metal pickups 102 and a lesser amount even number of magnets 104. As the seed plate 46 turns the rotary coupling 50 turns along with it, thus causing the vacuum shutoff valve assembly 86 to turn. Rotation of the bevel pinion 100 is resisted by the magnetic force of the interaction between the metal pickups 102 and the magnets 104. This causes the engagement between the bevel pinion 100 and the bevel gears 98 to cause the butterfly valves 94 to open when the seed plate is moving in the planting direction and closing when moving opposite of the planting direction. Though the rotation of the bevel pinion 100 is resisted by the magnets 104, an adequate amount of force caused by the regular turning of the seed plate 46 will cause the bevel pinion 100 to overcome the resistance and continue rotating along with the vacuum shutoff valve assembly 86 once the butterfly valves 94 have reached their limit stops. This allows actuation of the vacuum shutoff valve 86 in either direction automatically without prohibiting infinite rotation of the seed plate 46. In another embodiment, the resistive force can be provided through frictional contact of a rotating plate (not shown) located on the bevel pinion 100 and a stationary plate (not shown), having frictional force applied to the stationary plate (not shown) through a preloaded spring (not shown). The stationary plate (not shown) and spring (not shown) would be components of the housing cover assembly 52. In yet another embodiment, the resistive force can be provided through detent contact instead of frictional contact or magnetic force. Still, in another embodiment, a set of sliding discs 101 having a plurality of partitions 103 spaced around a center bore 99. The sliding disc 101 nearest the housing cover assembly 52 will have a plurality of ferromagnetic metal pickups 102 or similar other embodiments as already mentioned to cause the discs 101 to be resisted. The sliding discs 101 interact with one another via a slot 105 and cam 107. Such that as the metal pickups 102 or similar resistant embodiment is acted on, causing the partitions 103 to align with one another when the seed plate 46 is turning in the planting direction, and closing the flow of air in the rotary coupling 50 when turned opposite the planting direction.

The housing cover assembly 52 consists of a rotary coupling 50 rotatably held in place by a rotary bushing 90. A discharge conduit 106 that is in communication with the rotary coupling 50 at one end and with a vacuum inlet 108 in the meter housing 42 at the other end. The discharge conduit 106 provides a path for the air to flow to the meter housing 42 through a single vacuum outlet port 54. An actuator 110 is attached to the housing cover assembly 52 to provide rotational force to the seed plate 46. The housing cover assembly 52 provides quick, simple access to the seed plate 46 by loosening retaining latches 112 and swinging open the housing cover assembly 52. The housing cover assembly 52 can quickly be fully removed by first disconnecting the actuator 110 then loosening the retaining latches 112 and removing the hinge pin 114. This quick access housing cover assembly 52 allows fast and straightforward switching of seed plates 46 or feed modules 116 in just seconds per seed meter.

As the seed plate 46 turns in the planting direction, the seed is sucked onto the apertures 60. The seed is then moved along a path toward a release point 118 on the seed plate 46. The seed plate 46 causes the seeds to pass through a set of individual singulators 120 to inhibit the removal of any additional seeds present on each seed aperture 60 and leave remaining of only one seed per aperture. The singulators 120 consist of a knife edge 122 forming a lobed shape and having a planer face 124. A cam or roller bearing 126 protrudes out from the planer face 124 to ride on the bearing face 64 of the seed plate 46 seed disc 56. A slide pivot 121 allows the singulator to ungulate with the bearing face 64, and a preloaded spring 123 causes the planer face 124 of the singulator 120 to remain in contact with the planer face 62 of the seed plate 46 seed disc 56. The distance of each singulator 120 slide pivot 121 to the center of rotation of the seed plate 46 is varying such that the amount of seed aperture 60 coverage by the singulator 120 knife edge 122 has an aggressive coverage, a moderate coverage, and light coverage. Also, the amount of seed aperture 60 coverage by the singulator 120 knife edge 122 is controlled automatically by the outside diameter of the bearing face 64 in relation to the cam or roller bearing 126. Such that if more coverage is needed to adequately singulate a seed type, the bearing face 64 of that seed plate 64 type would be reduced, and vice versa. Any seeds that are removed from the seed aperture 60, then fall back into the seed pool.

The seeds will then travel through an anti-skip system that includes an anti-skip sensor 128 which will determine the presence of seed on each aperture 60. The anti-skip sensor 128 is mounted adjacent the circumference or outer periphery of the seed plate 46. The anti-skip sensors 128 are connected electrically or wirelessly to a computer 130 having a processor 132 and control system logic 133. If the anti-skip sensor 128 does not detect the presence of seed on a seed aperture 60, a signal will be sent to the computer 130. As a result, the computer 130 sends a signal to the actuator 110, that accelerates the rotational velocity of the seed plate 46 for a calculated period, then returns the rotational velocity to normal speed. This accelerated function occurs such that the missing seed will pass the release point 118 and introduce the next available seed in the same time as normal operations or as close as is possible considering normal operational speed and actuator performance.

After passing through the anti-skip sensor 128, the seed travels to the release point 118 where it is forcibly wedged off of the seed plate 46 by an ejector shoe assembly. The ejector shoe assembly, in one example includes ejector shoe 134 includes a curved knife edge 136 and a planer face 138. A preloaded spring force is provided such that the planer face 138 of the ejector shoe 134 rides flush against the planer face 62 of the seed plate 46 seed disc 56 allowing the curved knife edge 136 to provide consistent dislodging of the seed. Once the seed has been dislodged from the seed plate 46, it passes through a poking member 139 that is guided into the apertures 60 of the seed plate 46 via a cam member 141 to dislodge and knock out debris remaining in the seed plate 46 apertures 60.

In the multi-hybrid mode used to switch automatically or instantaneously between the delivery of two or more seed product varieties, the planting side will turn in the planting direction throughout operations, while the non-planting side will remain still. The seed product variety is switched either by a manual command by an operator or through pre-planned planting through field mapping. However, at the start of operations, the non-planting side via the computer 130 and control system logic 133 will actuate the seed plate 46 opposite the planting direction for a period to close the vacuum shutoff valve assembly 86 restricting air flow for that side. Once the non-planting side switches via the computer 130 to become the planting side, a series of actions will occur. The side to become the non-planting side will continue to run at normal speed, while the side to become the planting side will begin turning in the planting direction at a reduced speed. The actuation of the seed plate 46 on the side to become the planting side causes the vacuum shutoff valve assembly 86 to open, allowing air to flow, thus causing seeds to load onto the seed plate 46. Once the seed plate 46 on the side to become the planting side has reached the release point 118, it will begin running at normal planting speeds. The side to become the non-planting side will then stop and begin rotating for a period in the non-planting direction to close the vacuum shutoff valve assembly 86 on that side and restrict air flow.

In the single-hybrid mode, a cover (not shown) will replace the other meter housing 42. The cover (not shown) will provide blockage to the vacuum inlet 108 on the meter housing 42, such that air can flow only to the remaining meter housing.

Each meter housing 42 is mounted on either side of a centralized chassis 140. This chassis provides a quick and easy way to convert the seed meter assembly 40 from a single-hybrid meter to a multi-hybrid meter and vice versa. The chassis is mounted to the row planter and can provide mounting for other components as well.

A volumetric granular meter includes a feed module 116 may be used in place of the seed plate 46 to deliver granular particulates such as fertilizer, insecticide, and seed. The feed module 116 contains a housing 142 that houses a set of gears (not shown) and a transverse conduit (not shown). The transverse conduit is in communication with a feeding adapter 146 on one end and the rotary coupling 50 of the housing cover assembly 52 on the other. The feeding adapter 146 can be of any type and is preferably an auger or toothed type for fertilizer and insecticide. This type of feeding adapter 146 would prohibit the flow of air through the transverse conduit (not shown). Alternately, a drum with a plurality of apertures (not shown) can be used in communication with the transverse conduit (not shown) in a similar fashion as a typical seed plate. The feed module 116 is designed such that when it is installed in the meter housing 42, it creates a funneled chamber in the lower section where particulate can collect. An inlet 148 section allows particulate to interact with the feeding adapter 146. The actuator 110 will drive the set of gears (not shown) causing the feeding adapter 146 to rotate at a determined rate. The feeding adapter 146 will transport the particulate from the inlet 148 and release it at an outlet 150. The particulate will then travel through a gravity drop tube (not shown) down to the ground or the furrow. The volumetric granular meter is adapted to provide co-application delivery of a second product variety in addition to the seed product variety from the seed meter assembly. The second product variety includes, but is not limited to, granular fertilizer, liquid fertilizer at low pressure, pesticide, fungicide, insecticide, and granular seed. The seed meter assembly, the volumetric granular meter and a seed delivery system are modular components that are interchangeable.

An additional read sensor 152 in the meter housing 42 is positioned to detect an identification tag 153 placed on each type of seed plate 46 or feeding adapter 146. The read sensor 152 is preferably an RFID or Bluetooth type and is connected electrically or wirelessly to a computer 130 having a processor 132 and control system logic 133. Once a new seed plate 46 or feeding adapter 146 is placed into the meter housing 42, a signal is sent to the computer 130 which then alerts the control system logic 133. This information can be used by the control system logic 133 to do such things as, but not limited to: automatically adjust operation of the system for the number of apertures 60 on seed plate 46, adjust operations for the seed type being planted, or indicate an improper seed plate 46 or feeding adapter 146 is installed.

In another embodiment, a seed meter assembly 154 is mounted to the frame of a row planter (not shown). The seed meter assembly 154 is of any type and preferably is a multi-hybrid low friction type. The low friction seed meter 154 has a meter housing 42 that has a seed inlet port 44 to receive seed from either a hopper or air seed delivery system (not shown). Seed enters the seed inlet port 44 and pools in the lower section of the seed meter assembly 154 where it comes into contact with a seed plate 46. Ambient air flows through air inlet ports 48 in the meter housing 42, then into the seed plates 46, then through a rotary coupling 50, then through transverse conduit 162 that is adjacent a drive shaft 160, into a discharge conduit 164, then through a single vacuum outlet port 54. Vacuum pressure is maintained through the rotary coupling 50 via a low friction rotary seal 51. Preferably, the ends of the drive shaft 160 are threaded and extend through a rotary coupler 50 that is indexed to the drive shaft 160 and retained by a coupling nut 166 that is threadably held in place. The drive shaft 160 is driven by a single actuator 110, that drives both seed plates 46 congruently.

The seed plates 46 consists of a seed disc half 56 and a disc cover half 156 forming a hollow section by which vacuum flows. The seed disc half 56 has a plurality of seed apertures 60 evenly distributed on the planer face 62 near the bearing edge 64. The apertures 60 are of any shape and size, but preferably have a plurality of narrowing legs 172 that extend from a central diameter 174 of the aperture 60. As a result, increased suction is provided by the legs 172 and the central diameter 174 to hold the seed within the aperture 60 while discouraging the permittance of debris to become lodged within the aperture 60. Adjacent the seed apertures 60 on the planer face 62 are agitation pockets 66 that extend from approximately the seed aperture 60 seed path centerline toward the center of the seed plate 46. The agitation pockets (not shown) assist the seed to orientate and align with the seed apertures 60, thus ensuring consistent suction of seed onto the seed plate 46. The seed disc half 56 has a vacuum outlet port 78 in the center section. The outlet port has a sealing surface 80 along the peripheral edge. On the outer section of the sealing surface 80, is an indexed pocket 82 that is in communication with a rotary coupling 50. The disc cover half 156 has a borehole 158 in the center section to receive a receiving end of a drive shaft 160. The seed plates 46 are in indexed communication with the rotary coupling 50 and are threadably held in place to the drive shaft 160 ends with a wing nut 168.

As the seed plate 46 turns in the planting direction, the seed is sucked onto the apertures 60. The seed is then moved along a path toward a release point 118 on the seed plate 46. The seed plate 46 causes the seeds to pass through a set of individual singulators 120 to inhibit the removal of any additional seeds present on each seed aperture 60 and leave remaining of only one seed per aperture. The singulators 120 consist of a knife edge 122 forming a lobed shape and having a planer face 124. A cam or roller bearing 126 protrudes out from the planer face 124 to ride on the bearing face 64 of the seed plate 46 seed disc 56. A slide pivot 121 allows the singulator to ungulate with the bearing face 64, and a preloaded spring (not shown) causes the planer face 124 of the singulator 120 to remain in contact with the planer face 62 of the seed plate 46 seed disc 56. The distance of each singulator 120 slide pivot 121 to the center of rotation of the seed plate 46 is varying such that the amount of seed aperture 60 coverage by the singulator 120 knife edge 122 has an aggressive coverage, a moderate coverage, and light coverage. Also, the amount of seed aperture 60 coverage by the singulator 120 knife edge 122 is controlled automatically by the outside diameter of the bearing face 64. Such that if more coverage is needed to adequately singulate a seed type, the bearing face 64 of that seed plate 64 type would be reduced, and vice versa. Any seeds that are removed from the seed aperture 60, then fall back into the seed pool.

Seed then travels past a deflector 170 that when engaged causes seed to be wedged off of the seed plate 46 and back into the seed pool in the lower section of the meter housing 42.

The seeds will then travel through an anti-skip sensor 128 which will determine the presence of seed on each aperture 60. The anti-skip sensors 128 are connected electrically or wirelessly to a computer 130 having a processor 132. If the anti-skip sensor 128 does not detect the presence of seed on a seed aperture 60, a signal will be sent to the computer 130. As a result, the computer 130 sends a signal to the actuator 110, that accelerates the rotational velocity of the seed plate 46 for a calculated period, then returns the rotational velocity to normal speed. This accelerated function occurs such that the missing seed will pass the release point 118 and introduce the next available seed in the same time as normal operations or as close as is possible considering normal operational speed and actuator performance.

After passing through the anti-skip sensor 128, the seed travels to the release point 118 where it is forcibly wedged off of the seed plate 46 by an ejector shoe 134.

In multi-hybrid operations, both seed plates 46 rotate at equal speeds. The planting side will have the seed deflector 170 in the disengaged position, allowing the seed to pass without disruption. The not planting side will have the seed deflector 170 in the engaged position, causing the seed to be wedged off of the seed plate 46 and back into the seed pool.

An additional read sensor 152 in the meter housing 42 can be used in communication with an identification tag placed on each type of seed plate 46 or feed module 116. The read sensor 152 is preferably an RFID or Bluetooth type and is connected electrically or wirelessly to a computer 130 having a processor 132. Once a new seed plate 46 or feed module 116 is placed into the meter housing 42, a signal is sent to the computer 130 which then alerts the control program. This information can be used by the control program to do such things as, but not limited to: automatically adjust the number of apertures 60 on seed plate 46, change seed type being planted, or indicate an improper seed plate 46 or feeding adapter 146 is installed.

The seed meter assembly 40 is used with a conventional gravity drop tube (not shown) or alternatively with a high speed seed delivery system 200. The high speed seed delivery system 200 is of any size, type, or structure. In one example the seed delivery system 200 has a housing 202 and a plurality of seed transport rollers 204 disposed within the housing 202. The housing 202 has an opening at a seed receiving end 206 and another opening at a seed exit 208. The seed receiving end 206 is positioned adjacent a seed meter assembly 40 and adapted to receive and/or transport a seed from the seed meter assembly 40 to the seed delivery system 200. The seed exit 208 is positioned adjacent a furrow and adapted to discharge a seed into the furrow with little or no bounce or roll.

The housing 202 has an inner wall 211 that is formed to fit around an outer periphery of the seed transport rollers 204 leaving little or no space between the two, yet still permitting the seed transport rollers 204 to rotate within the inner wall 211. The seed transport rollers 204 are of any size, shape, and structure and in one example, the rollers 204 have a plurality of pockets 210 formed along a peripheral edge of the rollers 204 in which a seed is held and will travel, with each pocket 210 separated by a tooth 212. The seed transport rollers 204 are indexed, geared, and timed to one another so that during rotation the teeth 212 on adjacent rollers 204 align. The alignment of the teeth permit a seed to be transferred form one roller 204 to another in a hand off section 213 between rollers 204.

In another example, the seed transport rollers 204 are formed by a plurality of resilient disks spaced 215 apart from one other to form slots. The teeth 212 on roller 204 are offset from the teeth 212 of an adjacent roller so that the teeth are received within slots 218 and from a side view the teeth 212 of adjacent rollers 204 intersect.

Adjacent seed transport rollers 204 are adapted to rotate in opposite directions to create a serpentine delivery path 220 along the inner wall 211 of the housing 202. The inner wall 211 of the housing 202, along the delivery path 220, has a plurality of elongated fins 222. The height of the fins 222 along the length of the inner wall 211 decrease from an outer edge 224 of the inner wall 211 toward a center 226 of the inner wall 211. The gradual decrease in height of the fins 222 assist in centering a seed along the delivery path 220. Because the seed is centered and not bouncing back and forth in part due to centrifugal force, greater accuracy in plant spacing is achieved. Also, to assist in removing the seed from the seed plate, the length of the transition teeth 216 may be shorter on the outer edge of the rollers 204 and are greater as the teeth 216 are closer to the center of the roller 204.

The housing 202 has a delivery section 14 with a first conduit 18 for delivering granular material to a furrow and a second conduit 24 for delivering low pressure liquid fertilizer to a furrow. Preferably, the discharge for liquid fertilizer conduit is forward of the seed discharge so that nutrients are added to the furrow prior to the seed so that the nutrients are not poured on top of the seeds.

To further improve the accuracy of the spacing of seeds delivered to the furrow, the seed delivery system 200 has a variable speed component. In particular, the variable speed component has two modes of operation. The first mode drives the delivery system 200 at a speed exceeding the forward ground speed of the delivery system to allow the seed to breach the surface of the soil in the seed trench to reduce or eliminate seed roll or bounce. The second mode drives the delivery system at a speed slightly slower than the ground speed of the delivery system 200.

In one example, a ground speed sensor, such as GPS system 224 or the like, sends a signal to a controller 130. The controller 130 using control system logic 133 processes the signal to determine the ground speed and then sends a signal to the motor to adjust the speed of the seed delivery system 200 based upon a predetermined margin or difference.

The control system, including the computer 130, processor 132, and control system logic 133 is connected to and controls the operation of the seed meter assembly 40, the variable granular meter, and the seed delivery system 200. Preferably the control system controls operating parameters for variable rate application, section control, turning adjustments, and the like based upon detected operating parameters such as ground speed, predetermined planting populations and the number of seed cells on a seed plate.

What is claimed is:

1. A row planter assembly, comprising:
   a seed meter assembly having a housing mounted to a frame;
   a pair of seed plates disposed within the housing in spaced parallel relation connected to a drive shaft; and
   an inlet port formed in the housing in communication with an outlet port formed in the housing configured to create a vacuum to selectively pull seeds into apertures on the pair of seed plates.

2. The assembly of claim 1 wherein the outlet port is connected to a discharge conduit that is connected to a transverse conduit that is connected to an outer chamber between the pair of seed plates and a plurality of outer walls of the outer chamber and a makeup air chamber is positioned between the discharge conduit and the pair of seed plates.

3. The assembly of claim 1 further comprising a seed singulator and a seed deflector disposed within the housing.

4. The assembly of claim 1 further comprising sensors mounted adjacent the pair of seed plates within the housing.

5. The assembly of claim 4 wherein the sensors are connected to a computer having a processor, the computer configured to accelerate rotation of the pair of seed plates when the sensors do not detect a presence of a seed within an aperture of the seed meter.

6. The assembly of claim 1 further comprising a pair of seed conduits, each in communication with a seed pool.

* * * * *